Nov. 2, 1926.

Re. 16,450

J. ABRAMOWITZ

ARCH SUPPORT

Original Filed Dec. 18, 1922

INVENTOR
Joseph Abramowitz.
BY Joseph Kleinh
ATTORNEY

Reissued Nov. 2, 1926. Re. 16,450

UNITED STATES PATENT OFFICE.

JOSEPH ABRAMOWITZ, OF MADISON, ILLINOIS, ASSIGNOR OF ONE-HALF TO JOHN J. SELB, OF VENICE, ILLINOIS.

ARCH SUPPORT.

Original No. 1,467,630, dated September 11, 1923, Serial No. 607,591, filed December 18, 1922. Application for reissue filed August 11, 1924. Serial No. 731,515.

This invention relates to a certain new and useful improvement in arch-supports and has for its chief object the provision of a simple, inexpensive arch-support which may be readily fitted in the shoe and which is capable of convenient height adjustment to build up a shoe or other foot-wear to properly and comfortably support the metatarsus or instep of the foot.

With the above and other objects in view, my present invention resides in the novel features of form, construction, arrangement, and combination of parts hereinafter described and afterwards pointed out in the claims.

In the accompanying drawing.

Figure 1:
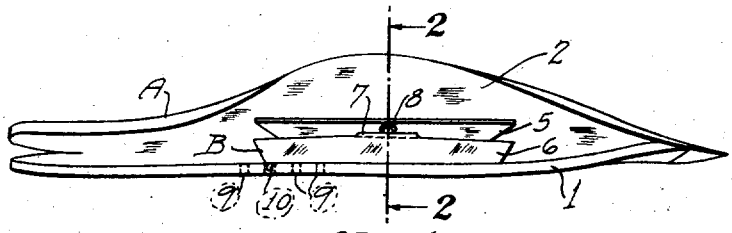
Figure 1 is a side elevational view of an arch-support embodying my invention.

Referring now more in detail and by reference characters to the said drawing, which illustrates a preferred embodiment of my invention, 1 indicates the base of the support A, which is formed or constructed of suitable material and shaped and contoured to conveniently fit within a shoe at the shank and heel thereof.

2 indicates the upper member of the support A, which is of a size and contour to likewise conveniently fit within the shoe, and which not only normally inclines transversely, that is to say, is higher relatively to base 1 at its inner margin than at its outer margin, but is also bodily both longitudinally and laterally permanently shaped to approximately conform to and provide a support for the arch of the human-foot.

Figure 2:
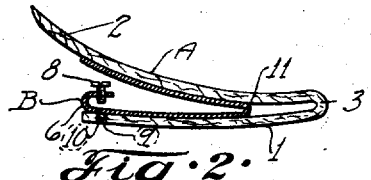
Figure 2 is a transverse sectional view of the arch-support taken approximately on the line 2—2, Figure 1.

Preferably, the base 1 and upper member 2 are formed from a single section of suitable leather, fiber, or the like, with one edge of their side margins integrally joined or connected, as at 3, Figure 2; but such parts of the support, as will be obvious, may be of separate sections suitably fastened operatively together at their one or outer side margin. As so formed and constructed, the base 1 and upper member 2 are yielding or movable relatively to each other somewhat in the nature of the pivotally connected members of a hinge, and as also so constructed and finished, the support proper A may be used and employed within the shoe to proportionately, with the combined thickness of its members 1 and 2, build up the arch of the shoe.

Figure 3:
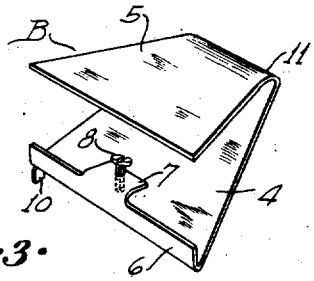
Figure 3 is a detached perspective view of the height adjusting member of the arch-support.

However, to further and adjustably build up the arch of the shoe to meet the requirements of different feet, I employ as a part of the support proper the height-adjusting member B illustrated particularly in Figure 3. This member B is constructed preferably from a single blank of sheet metal, fibre, or other suitable material bent upon itself intermediate its ends, as at 11, to integrally provide the overlapping relatively yielding sections or portions 4 and 5. At its free end, the base or under portion 4 of member B is flanged upwardly, as at 6, which flange, in turn, is formed with an inwardly presented tongue or projection 7 suitably tapped or otherwise formed to provide a thread-seat for a screw or the like 8.

The member B is of such size relatively to the support proper A as to endwise fit between its members 1 and 2, as seen in Figures 1 and 2, and efficiently functions, as the screw 8 is adjustably threaded in its seat, to selectively transversely or hingedly space or spread the sections 4 and 5 and correspondingly members 1 and 2 of the support A to further build up the shoe at its arch to adjustably meet the requirements of different feet.

The base-member 1 of the support-proper A is provided longitudinally adjacent its free outer edge with a series of spaced perforations 9, adapted selectively for removable engagement with which is a tongue 10 depending from the under-member 4 of member B. By means of said co-operating tongue 10 and perforations 9, the member B, being adapted also for selective location longitudinally between the members 1 and 2 of support A, may be removably secured against displacement in any selected location intermediate the members 1 and 2 of support A.

My new arch-support may be inexpensively manufactured, may be made in various shapes and sizes to fit shoes of different sizes and to accommodate arches or insteps of various contour, and is exceedingly effective in the performance of its intended functions.

I am aware that minor changes in the form, construction, arrangement, and combination of the several parts of the arch-support may be made and substituted for those herein shown and described without departing from the nature and principle of my invention.

Having thus described my invention, what I claim and desire to secure by Letters Patent is:

1. An arch-support adapted to fit within a shoe and comprising a base and an arch-supporting element, the latter being contoured and shaped to conform approximately to the instep or arch of the foot and having connection at one side margin with the base for relatively yielding hinged movement, in combination with means adapted for edgewise disposition intermediate the base and element for adjustably spacing the element hingedly from the base to vary the arch-supporting height of the support, said means including a member comprising a pair of connected relatively yielding sections, and a screw-member thread-seated for adjustable movement in one of said sections and with which screw-member the other section is adapted for engagement.

2. An arch-support adapted to fit within a shoe and comprising a base and an arch-supporting element, the latter being contoured and shaped to conform approximately to the instep or arch of the foot and having connection at one side margin with the base for relatively yielding hinged movement, in combination with means adapted for edgewise disposition intermediate the base and element for adjustably spacing the element hingedly from the base to vary the arch-supporting height of the support, said means including a member comprising a pair of overlapping connected relatively yielding sections, a screw seat upon one of said sections, and a screw adjustably threaded in the seat for adjustably hingedly spacing the upper section from the lower section.

3. An arch-support adapted to fit within a shoe and comprising a base and an arch-supporting element, the latter being contoured and shaped to conform approximately to the instep or arch of the foot and having connection at one side margin with the base for relatively yielding hinged movement and the base having a series of perforations, in combination with means including a member adapted for adjustable disposition intermediate the base and element for adjustably spacing the element hingedly from the base to vary the arch-supporting height of the support, and a tongue on said member adapted for selective engagement with said perforations for detachably securing said member in adjusted position between the base and element.

4. An arch-support adapted to fit within a shoe comprising a base and an arch-supporting element, the latter being disposed over and movable relatively to the base, in combination with means adapted for removable edgewise disposition intermediate the base and element for adjustably spacing the same for varying the arch-supporting height of the support, said means including a body-portion and a screw-member adjustably carried by the body-portion.

5. An arch-support adapted to fit within a shoe and comprising a base and a co-operating superimposed element having connection at one side margin with the base for relatively hinged movement, in combination with means including a member adapted for removable edgewise disposition intermediate the base and element, and a screw-member having engagement with said member for adjustably spacing the base and element for varying the arch-supporting height of the support.

6. An arch-support adapted to fit within a shoe and comprising a base and a co-operating superimposed element having connection at one side margin with the base for relatively hinged movement, in combination with a member adapted for removable edgewise disposition intermediate the base and element, said member including co-operating sections having connection at one side margin for relatively hinged movement, and a screw-member having threaded connection with said member for hingedly actuating said sections for adjustably spacing the element hingedly from the base to vary the arch-supporting height of the support.

7. An arch-support adapted to fit within a shoe and comprising a base and an arch-supporting element, the latter being disposed over and movable relatively to the base and the base having a series of perforations, in combination with means adapted for adjustable disposition intermediate the base and element for spacing the element hingedly from the base to vary the arch-supporting height of the support, and a projection on said means adapted for selective engagement with said perforations for detachably securing said means in adjusted position between the base and element.

In witness whereof, I have signed my name to this specification.

JOSEPH ABRAMOWITZ.